United States Patent
Lee et al.

(10) Patent No.: US 10,581,274 B2
(45) Date of Patent: Mar. 3, 2020

(54) HOME APPLIANCE

(71) Applicants: LG ELECTRONICS INC., Seoul (KR); RESEARCH COOPERATION FOUNDATION OF YEUNGNAM UNIVERSITY, Gyungsangbuk-do (KR)

(72) Inventors: Soongkeun Lee, Seoul (KR); Chungill Lee, Seoul (KR); Seonwook Park, Seoul (KR); Sungwoo Bae, Daegu (KR); Jaejung Yun, Daegu (KR); Jeongtae Kim, Gyungsangnam-do (KR); Younggeun Lee, Gyonggi-do (KR)

(73) Assignees: LG ELECTRONICS INC., Seoul (KR); RESEARCH COOPERATION FOUNDATION OF YEUNGNAM UNIVERSITY, Gyungsangbuk-Do (KR)

( * ) Notice: Subject to any disclaimer, the term of this patent is extended or adjusted under 35 U.S.C. 154(b) by 129 days.

(21) Appl. No.: 15/800,900

(22) Filed: Nov. 1, 2017

(65) Prior Publication Data
US 2018/0054089 A1    Feb. 22, 2018

Related U.S. Application Data

(63) Continuation-in-part of application No. 15/171,284, filed on Jun. 2, 2016, now Pat. No. 10,199,870, and
(Continued)

(30) Foreign Application Priority Data

Jun. 30, 2015 (KR) .................. 10-2015-0078812
Aug. 11, 2015 (KR) .................. 10-2015-0113424

(51) Int. Cl.
*H02J 50/10* (2016.01)
*H02J 50/80* (2016.01)
(Continued)

(52) U.S. Cl.
CPC .............. *H02J 50/10* (2016.02); *G09G 5/006* (2013.01); *H02J 50/12* (2016.02); *H02J 50/80* (2016.02);
(Continued)

(58) Field of Classification Search
CPC . H02J 50/10; H02J 50/12; H02J 50/80; H02P 21/24; H04W 4/80; G09G 5/003;
(Continued)

(56) References Cited

U.S. PATENT DOCUMENTS 5,801,509 A    9/1998    Sawa et al.
5,854,548 A    12/1998   Taga et al.
(Continued)

FOREIGN PATENT DOCUMENTS

EP    2 897 253      7/2015
JP    H 08-084891    4/1996
(Continued)

OTHER PUBLICATIONS

United States Office Action dated Feb. 7, 2018 issued in co-pending U.S. Appl. No. 15/171,284.
(Continued)

*Primary Examiner* — Hal Kaplan
(74) *Attorney, Agent, or Firm* — Ked & Associates, LLP

(57) ABSTRACT

A home appliance is disclosed, including a first circuit unit including a converter configured to convert an Alternating Current (AC) power into a Direct Current (DC) power, a first coil, a first modulator/demodulator configured to wirelessly transmit the DC power generated by the converter using the first coil, and a first controller configured to control the first modulator/demodulator, and a second circuit including a second coil configured to receive a wireless power transmitted by the first circuit unit, a second modulator/demodulator configured to convert the wireless power received from
(Continued)

the second coil, a rectifier configured to rectify an AC power generated by the second modulator/demodulator, and a second controller configured to control operation of the second modulator/demodulator, wherein the first modulator/demodulator and the second modulator/demodulator perform bidirectional time-division data communication.

19 Claims, 12 Drawing Sheets

Related U.S. Application Data a continuation-in-part of application No. 15/232,862, filed on Aug. 10, 2016, now abandoned.

(51) Int. Cl.
| | |
|---|---|
| *H04W 4/80* | (2018.01) |
| *H02J 50/12* | (2016.01) |
| *H02P 21/24* | (2016.01) |
| *G09G 5/00* | (2006.01) |
| *G09G 5/36* | (2006.01) |

(52) U.S. Cl.
CPC .............. *H02P 21/24* (2016.02); *H04W 4/80* (2018.02); *G09G 5/003* (2013.01); *G09G 5/36* (2013.01); *G09G 2330/02* (2013.01); *G09G 2370/16* (2013.01)

(58) Field of Classification Search
CPC ...... G09G 5/006; G09G 5/36; G09G 2330/02; G09G 2370/16
USPC .......................................................... 307/31
See application file for complete search history.

(56) References Cited

U.S. PATENT DOCUMENTS

| | | | |
|---|---|---|---|
| 5,859,518 | A | 1/1999 | Vitunic |
| 6,005,364 | A | 12/1999 | Acarnley |
| 6,411,060 | B1 | 6/2002 | Jung |
| 6,838,844 | B2 | 1/2005 | Shimizu et al. |
| 7,482,802 | B2 | 1/2009 | Finkler et al. |
| 7,772,790 | B2 | 8/2010 | Nashiki |
| 8,054,030 | B2 | 11/2011 | Son et al. |
| 10,003,216 | B2 * | 6/2018 | Kozakai ................ H02J 50/80 |
| 2003/0107339 | A1 | 6/2003 | Shimizu et al. |
| 2008/0129243 | A1 | 6/2008 | Nashiki |
| 2008/0157708 | A1 | 7/2008 | Finkler et al. |
| 2008/0303516 | A1 | 12/2008 | Lamprecht |
| 2009/0150027 | A1 | 6/2009 | Takamatsu et al. |
| 2009/0160384 | A1 | 6/2009 | Mullin et al. |
| 2009/0164047 | A1 | 6/2009 | Hwang et al. |
| 2009/0184678 | A1 | 7/2009 | Son et al. |
| 2010/0148753 | A1 | 6/2010 | Ha et al. |
| 2010/0295492 | A1 | 11/2010 | Chakrabarti et al. |
| 2011/0219816 | A1 | 9/2011 | Tanaka et al. |
| 2011/0291599 | A1 | 12/2011 | El-Antably et al. |
| 2012/0005840 | A1 | 1/2012 | Jang et al. |
| 2012/0006065 | A1 | 1/2012 | Jung et al. |
| 2012/0023681 | A1 | 2/2012 | Park et al. |
| 2012/0144872 | A1 | 6/2012 | Kappler et al. |
| 2012/0177096 | A1* | 7/2012 | Yano .................... H04L 1/0057 375/224 |
| 2012/0187878 | A1 | 7/2012 | Fukasaku et al. |
| 2012/0235610 | A1 | 9/2012 | Hisano et al. |
| 2013/0026847 | A1 | 1/2013 | Kim et al. |
| 2013/0055770 | A1 | 3/2013 | Kim et al. |
| 2013/0069572 | A1 | 3/2013 | Maekawa |
| 2013/0082630 | A1 | 4/2013 | Purfuerst et al. |
| 2013/0134793 | A1 | 5/2013 | Ryu et al. |
| 2013/0147279 | A1 | 6/2013 | Muratov |
| 2013/0214711 | A1 | 8/2013 | Omata et al. |
| 2013/0214712 | A1 | 8/2013 | Omata et al. |
| 2013/0239336 | A1 | 9/2013 | Kim et al. |
| 2013/0271048 | A1 | 10/2013 | Iwashita et al. |
| 2013/0278187 | A1 | 10/2013 | Suzuki et al. |
| 2013/0307452 | A1 | 11/2013 | Sonoda et al. |
| 2014/0225551 | A1 | 8/2014 | Omata et al. |
| 2014/0300309 | A1 | 10/2014 | Yoo |
| 2014/0340033 | A1* | 11/2014 | Kim ....................... H02J 7/025 320/108 |
| 2014/0375233 | A1 | 12/2014 | Blasko |
| 2014/0375235 | A1 | 12/2014 | Yamashita et al. |
| 2015/0002062 | A1 | 1/2015 | Kim et al. |
| 2015/0002064 | A1 | 1/2015 | Ko et al. |
| 2015/0075195 | A1 | 3/2015 | Suzuki |
| 2015/0102758 | A1 | 4/2015 | Han |
| 2015/0263531 | A1* | 9/2015 | Kozakai ................ H02J 50/80 307/104 |
| 2015/0280619 | A1 | 10/2015 | Marohl et al. |
| 2015/0333686 | A1 | 11/2015 | Nakai |
| 2016/0011009 | A1 | 1/2016 | Shimizu et al. |
| 2017/0047875 | A1 | 2/2017 | Jang et al. |

FOREIGN PATENT DOCUMENTS

| | | |
|---|---|---|
| JP | 2008-132257 | 6/2008 |
| KR | 10-2014-0060186 | 5/2014 |
| KR | 10-2015-0004761 | 1/2015 |
| KR | 10-2015-0082361 | 7/2015 |

OTHER PUBLICATIONS

Korean Office Action dated Apr. 6, 2016 issued in Application No. 10-2015-0078812.
European Search Report dated Oct. 26, 2016 issued in Application No. 16172371.3.
Korean Office Action dated Jul. 7, 2016 issued in Application No. 10-2015-0113424.
European Search Report dated Jan. 17, 2017 issued in Application No. 16183378.5.
United States Office Action dated May 30, 2017 issued in co-pending U.S. Appl. No. 15/232,862.
United States Final Office Action dated Oct. 12, 2017 issued in co-pending U.S. Appl. No. 15/232,862.

* cited by examiner

HOME APPLIANCE

CROSS-REFERENCE TO RELATED APPLICATIONS

This application is a Continuation-In-Part of prior U.S. patent application Ser. No. 15/171,284 filed Jun. 2, 2016, which claims priority under 35 U.S.C. § 119 to Korean Patent Application No. 10-2015-0078812, filed on Jun. 3, 2015, and is a Continuation-In-Part of prior U.S. patent application Ser. No. 15/232,862 filed Aug. 10, 2016, which claims priority under 35 U.S.C. § 119 to Korean Patent Application No. 10-2015-0113424, filed on Aug. 11, 2015, whose entire disclosures are hereby incorporated by reference.

BACKGROUND

1. Field

The present disclosure relates to a home appliance and, more particularly, to a home appliance capable of performing wireless power transmission and bidirectional communication between circuit units.

2. Background

Home appliances refer to apparatuses used at home, such as a laundry treatment machine and a refrigerator, and accomplish operations such as laundry treatment, food refrigeration, freezing, etc., based on rotation of a motor, for users. With advances in various communication schemes and advances in various display schemes, study into adding functions for user convenience to the home appliances has been conducted.

BRIEF DESCRIPTION OF THE DRAWINGS

The embodiments will be described in detail with reference to the following drawings in which like reference numerals refer to like elements wherein.

DETAILED DESCRIPTION

Figure 1:
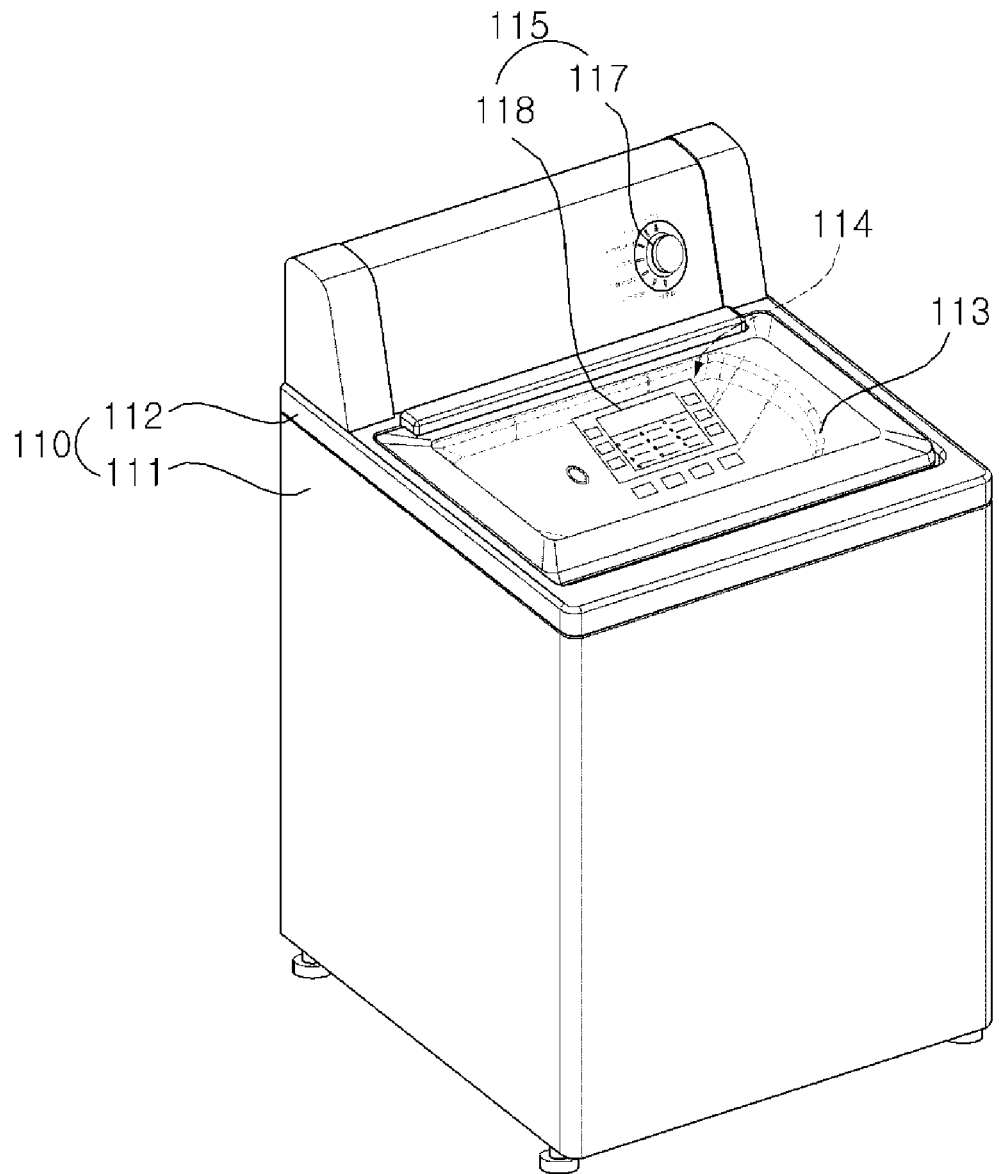
FIG. 1 is a perspective view showing a laundry treatment machine, which is an exemplary home appliance, according to an embodiment of the present disclosure.
Figure 11:
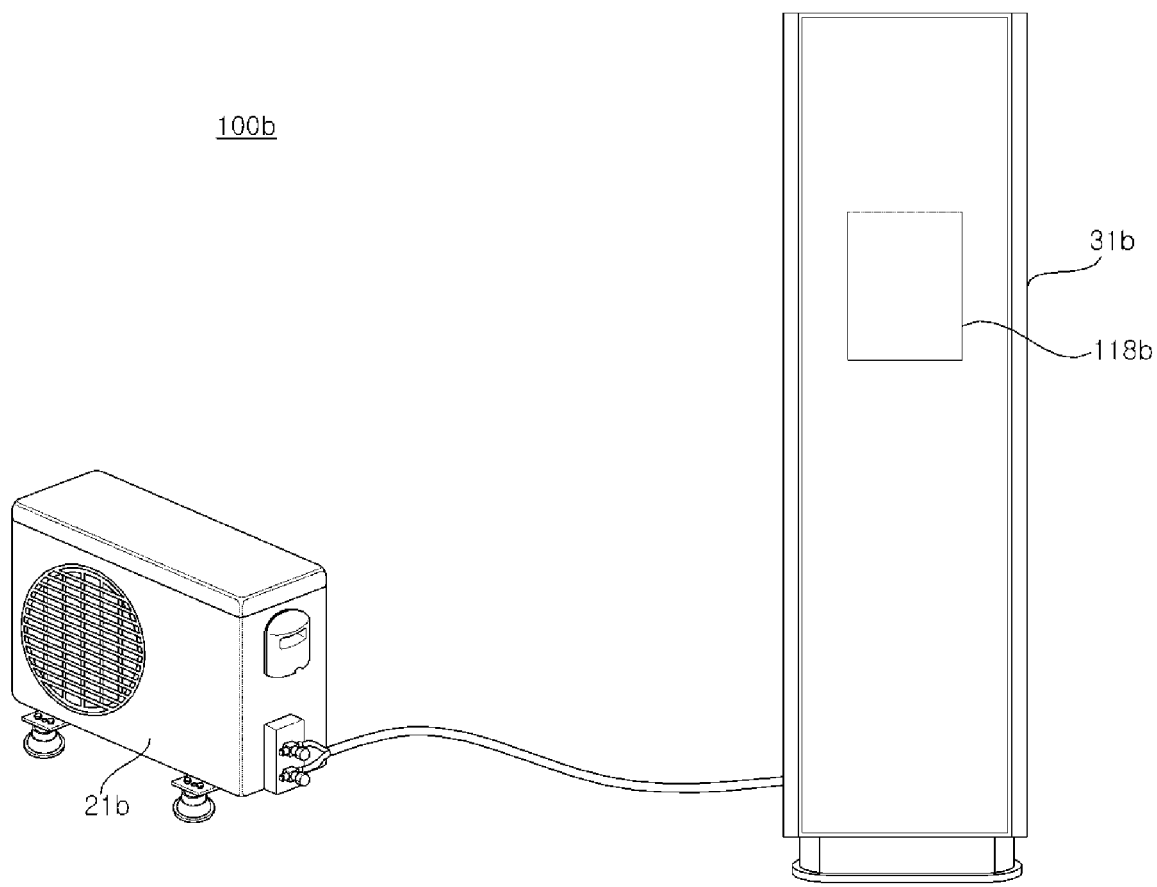
FIG. 11 is a perspective view showing an air conditioner, which is another exemplary home appliance, according to an embodiment of the present disclosure.
Figure 12:
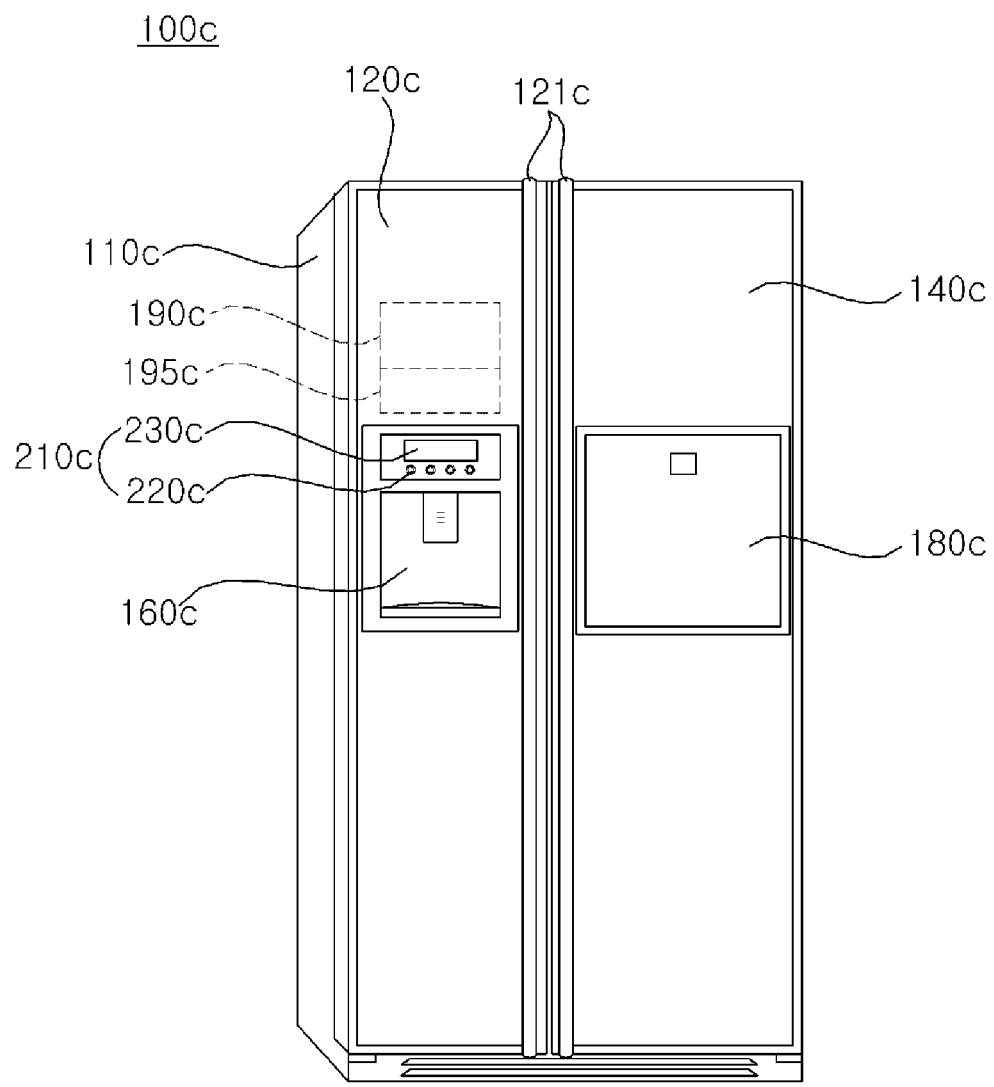
FIG. 12 is a perspective view showing a refrigerator, which is still another exemplary home appliance, according to an embodiment of the present disclosure.

A home appliance 100 described in the present disclosure may include various devices such as a laundry treatment machine 100a of FIG. 1, an air conditioner 100b of FIG. 11, and a refrigerator 100c of FIG. 12. The home appliance 100 may also include a cooking machine, a TV, an air purifier, and a water purifier. Hereinafter, the laundry treatment machine 100a of FIG. 1, the air conditioner 100b of FIG. 11, and the refrigerator 100c of FIG. 12 will be described as the home appliance 100.

Figure 2:
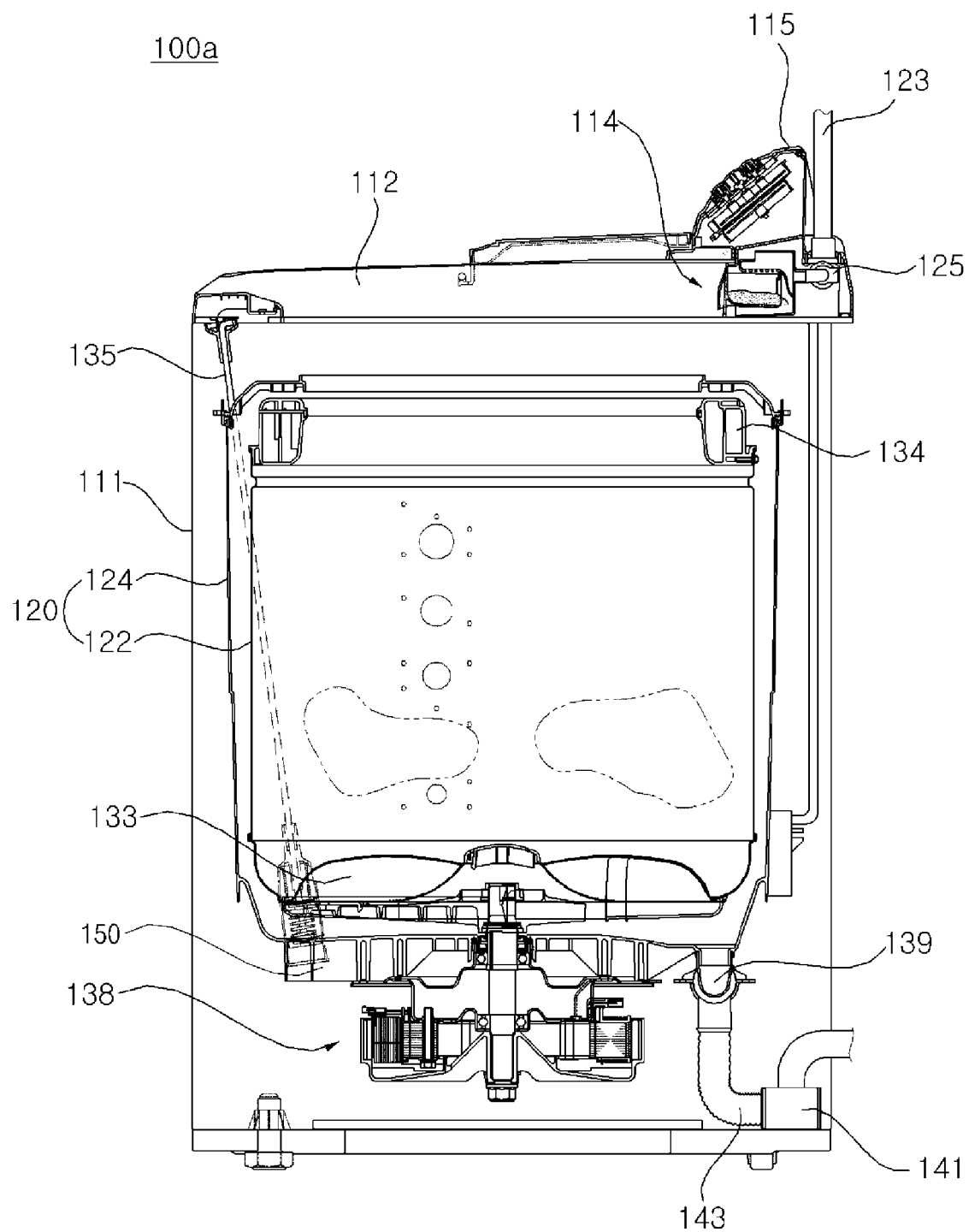
FIG. 2 is a side sectional view of the laundry treatment machine of FIG. 1.

FIG. 1 is a perspective view showing a laundry treatment machine, which is an exemplary home appliance, according to an embodiment of the present disclosure and FIG. 2 is a side sectional view of the laundry treatment machine of FIG. 1. Referring to FIGS. 1 and 2, the laundry treatment machine 100a, which is an exemplary home appliance, according to an embodiment of the present disclosure is a top load type laundry treatment machine configured such that laundry is introduced into a washtub from above. Such a top load type laundry treatment machine includes a washing machine that implements washing, rinsing, and dehydration of laundry introduced thereinto and a drying machine that dries wet laundry introduced thereinto. The following description will be given focusing on the washing machine.

The washing machine 100a includes a casing 110 forming the external appearance of the laundry treatment machine 100a, a control panel 115 that includes an input unit 117 for receiving a variety of control commands from a user and a display unit for displaying information regarding an operational state of the washing machine 100a and thus provides a user interface, and a door 113 hinged to the casing 110 to open and close a laundry introduction opening through which laundry is introduced and removed.

The casing 110 may include a main body 111 defining a space in which a variety of components of the washing machine 100a may be accommodated and a top cover 112 which is provided at the upper side of the main body 111, the top cover defining the laundry introduction opening through which laundry is introduced into an inner tub 122. The casing 110 is described as including the main body 111 and the top cover 112. However, the casing 110 is not limited thereto and any other casing configuration defining the external appearance of the washing machine 100a may be used. Meanwhile, a support rod 135 will be described as being coupled to the top cover 112 that constitutes the casing 110. However, the support rod 135 is not limited thereto and may be coupled to any fixed portion of the casing 110.

The control panel 115 includes the input unit 117 for manipulating an operational state of the washing machine 100a and the display unit 118 located at one side of the input unit 117 to display an operational state of the washing machine 100a. The door 113 is used to open and close the laundry introduction opening (not shown) formed in the top cover 112. The door 113 may include a transparent member, such as tempered glass, to allow the user to see the interior of the main body 111.

Meanwhile, in relation to an embodiment of the present disclosure, the control panel 115 may be located on the door 113. Alternatively, only a part of the control panel 115 may be located on the door 113. For example, the display unit 118 and a circuit unit for controlling the display unit 118 may be located on the door 113. Meanwhile, the input unit 117 may further be located on the door 113 configured to be opened and closed.

If at least one of the display unit 118 and the input unit 117 are located on the door 113 configured to be opened and closed, a display controller (not shown) for signal processing of the display unit 118 or the input unit 117 should be arranged in the proximity of the display unit 118 or the input unit 117. Therefore, the display controller is desirably located on the door 113. If a circuit unit (not shown), such as a circuit board (not shown), including the display controller (not shown) is located on the door 113 configured to be opened and closed, wires should be connected to additionally supply a drive power to the circuit unit (not shown).

However, when the wires are connected to the circuit unit (not shown) attached to the door 113 configured to be opened and closed, the wires may wear down and may deteriorate aesthetics. Accordingly, the present disclosure adopts a wireless power transmission scheme during supply of a power to the circuit unit (not shown) attached to the door 113 configured to be opened and closed. The wireless power transmission scheme will be described later with reference to FIGS. 3 to 6.

The washing machine 100a may include a washtub 120. The washtub 120 may consist of an outer tub 124 for containing wash water and an inner tub 122 for accommodating laundry, the inner tub 122 being rotatably mounted in the outer tub 124. A balancer 134 may be provided in an upper region of the washtub 120 to compensate for eccentricity generated during rotation of the washtub 120.

The washing machine 100a may further include a pulsator 133 rotatably mounted at a lower part of the washtub 120. A drive device 138 serves to supply drive power required to rotate the inner tub 122 and/or the pulsator 133. A clutch (not shown) may be provided to selectively transmit drive power of the drive device 138 such that only the inner tub 122 is rotated, only the pulsator 133 is rotated, or both the inner tub 122 and the pulsator 133 are simultaneously rotated.

Figure 3:
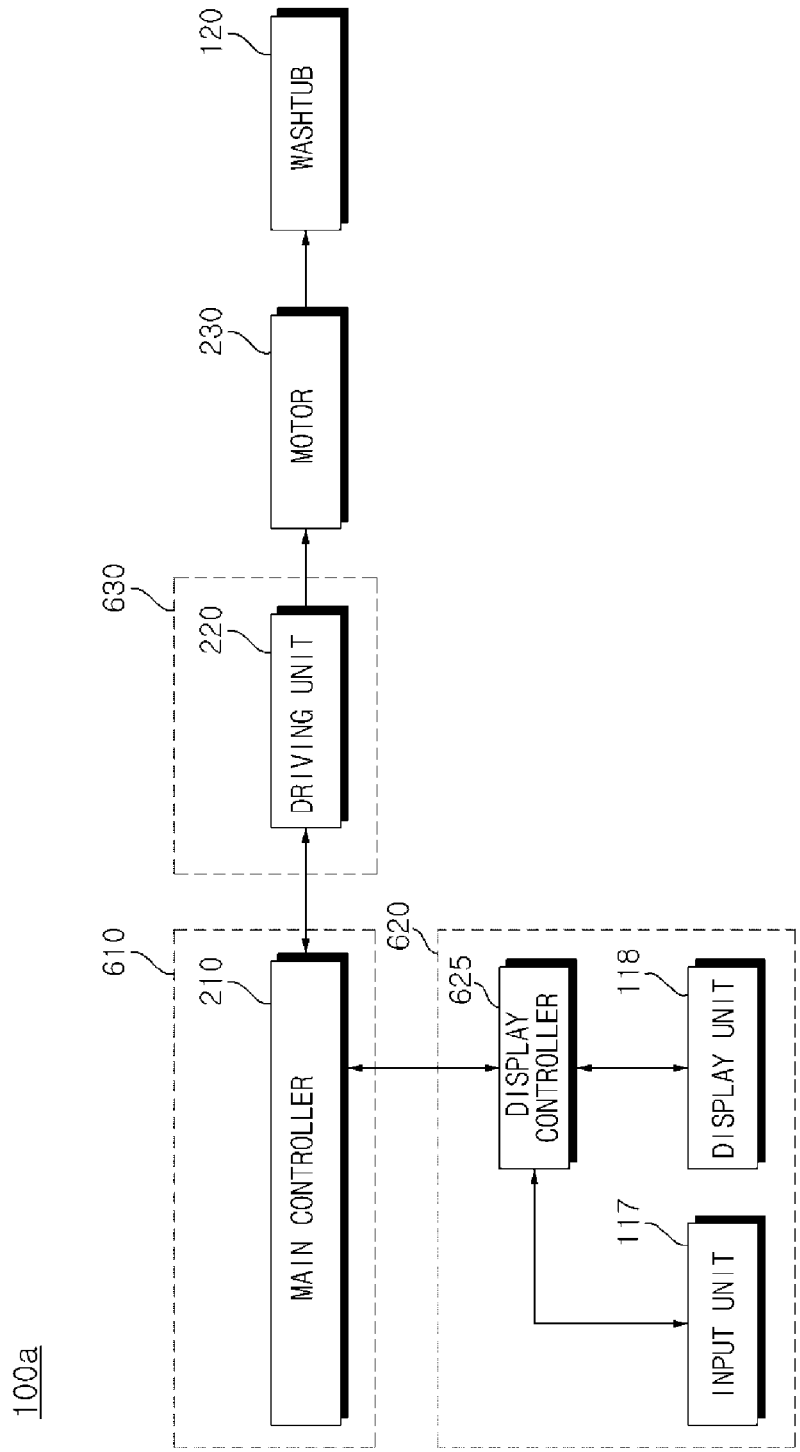
FIG. 3 is a block diagram of the internal configuration of the laundry treatment machine of FIG. 1.

The drive device 138 is operated by a driving unit 220 of FIG. 3, i.e., a drive circuit. This will be described later with reference to FIG. 3 and the following drawings.

Meanwhile, the top cover 112 is provided with a detergent box 114, in which a variety of additives such as detergent for washing, fabric conditioner, and/or bleach are accommodated, so as to be pulled away from or pushed towards the top cover 112. Wash water supplied through a water supply passageway 123 is supplied into the inner tub 122 by way of the detergent box 114.

The inner tub 122 has a plurality of holes (not shown) such that wash water supplied into the inner tub 122 flows to the outer tub 124 through the holes. A water supply valve 125 may be provided to control the flow of wash water through the water supply passageway 123.

Wash water in the outer tub 124 is discharged through a water discharge passageway 143. A water discharge valve 139 for controlling the flow of wash water through the water discharge passageway 143 and a water discharge pump 141 for pumping wash water may be provided.

The support rod 135 serves to suspend the outer tub 124 from the casing 110. One end of the support rod 135 is connected to the casing 110 and the other end of the support rod 135 is connected to the outer tub 124 via a suspension 150.

The suspension 150 serves to attenuate vibration of the outer tub 124 during operation of the laundry treatment machine 100. For example, the outer tub 124 may vibrate as the inner tub 122 is rotated. During rotation of the inner tub 122, the suspension 150 may attenuate vibration caused by various factors, such as eccentricity of laundry accommodated in the inner tub 122, the rate of rotation, and resonance of the inner tub 122.

FIG. 3 is a block diagram of the internal configuration of the laundry treatment machine of FIG. 1. Referring to FIG. 3, the laundry treatment machine 100a may include a first circuit unit 610 including a main (or first) controller 210, a second circuit 620 including a display (or second) controller 625, the display unit 118, and the input unit 117, and a third circuit 630 including a driving unit 220. The first circuit unit 610 and the third circuit 630 may be integrated into one circuit.

The display controller 625 may control the input unit 117 for manipulating an operational state of the laundry treatment machine 100a and the display unit 118 for displaying the operational state of the laundry treatment machine 100a. The driving unit 220 is controlled by the main controller 210 and drives a motor 230. Thus, the washtub 120 is rotated by the motor 230.

The main controller 210 is operated upon receiving an operating signal input by the input unit 117. Thereby, washing, rinsing, and dehydration processes may be implemented. In addition, the main controller 210 may control the display unit 118 for displaying washing courses, washing time, dehydration time, rinsing time, current operational state, and the like.

The main controller 210 may also control the driving unit 220 for operating the motor 230. In this case, a sensor for sensing the location of a rotor of the motor 230 is not provided at the interior or exterior of the motor 230. That is, the driving unit 220 controls the motor 230 in a sensorless manner.

The driving unit 220, which serves to drive the motor 230, may include an inverter (not shown), an inverter controller (not shown), an output current detector (E of FIG. 4) for detecting an output current io flowing into the motor 230. In addition, the driving unit 220 may further include a converter for supplying a Direct Current (DC) power input to the inverter (not shown).

For example, the inverter controller (430 of FIG. 4) of the driving unit 220 estimates the location of the rotor of the motor 230, based on the output current io. In addition, the inverter controller (430 of FIG. 4) controls rotation of the motor 230 based on the estimated location of the rotor of the motor 230.

More specifically, if the inverter controller (430 of FIG. 4) outputs a Pulse Width Modulation (PWM) based switching control signal (Sic of FIG. 4) to the inverter (not shown) based on the output current io, the inverter (not shown) may supply an Alternating Current (AC) power having a predetermined frequency to the motor 230 through a fast switching operation. The motor 230 is then rotated by the AC power of the predetermined frequency.

The driving unit 220 will be described later with reference to FIG. 4. Meanwhile, the main controller 210 may detect laundry quantity based on the current io detected by the current detector (E of FIG. 4). For example, the main controller 210 may detect laundry quantity based on the current io of the motor 230 during rotation of the washtub 120.

The main controller 210 may also detect eccentricity of the washtub 120, i.e., unbalance (UB) of the washtub 120. Detection of eccentricity may be performed based on ripple components of the current io detected by the current detector (E of FIG. 4) or variation in the rate of rotation of the washtub 120.

Figure 4:
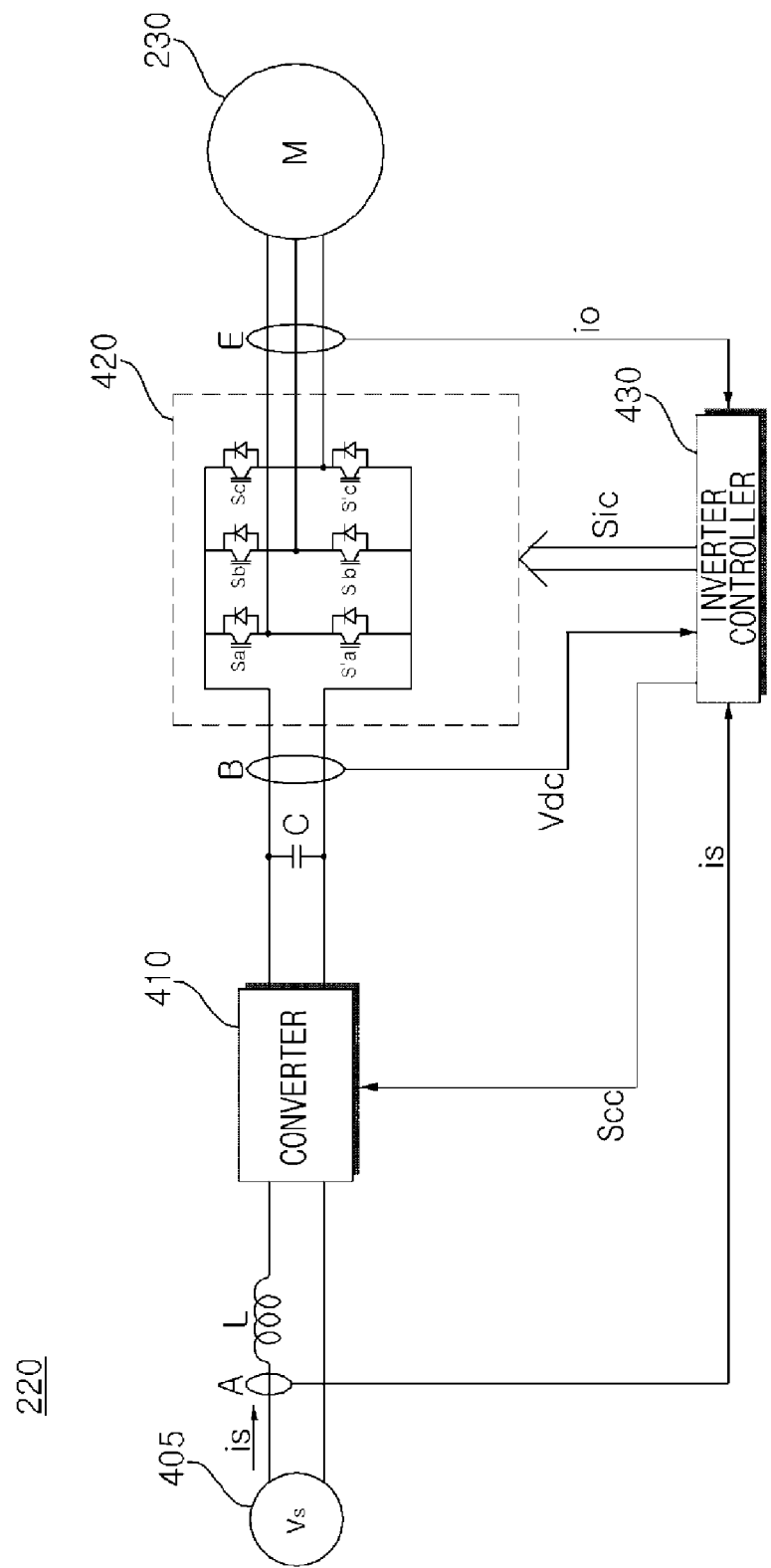
FIG. 4 is a circuit diagram of the internal configuration of the driving unit shown in FIG. 3.

FIG. 4 is a circuit diagram of the internal configuration of the driving unit shown in FIG. 3. Referring to FIG. 4, the driving unit 220 according to an embodiment of the present disclosure serves to drive a sensorless motor and may include a converter 410, an inverter 420, an inverter controller 430, a DC terminal voltage detector B, a smoothing capacitor C, an output current detector E. The driving unit 220 may further include an input current detector A and a reactor L.

The reactor L is located between a commercial AC power source (vs) 405 and the converter 410 to perform power factor correction or boosting. In addition, the reactor L may function to restrict harmonic current caused by fast switching.

The input current detector A may detect input current is input from the commercial AC power source 405. To this end, a Current Transformer (CT), a shunt resistor, etc. may be used as the input current detector A. The detected input current is may be a discrete pulse signal and may be input to the inverter controller 430.

The converter 410 converts an AC power, output from the commercial AC power source 405 via the reactor L, into a DC power. Although FIG. 4 illustrates the commercial AC power source 405 as a single phase AC power source, the commercial AC power source 405 may be a three-phase AC power source. Depending on the type of the commercial AC power source 405, the internal configuration of the converter 410 varies.

The converter 410 may consist of diodes without switching elements to perform rectification without a switching operation. For example, when the AC power source 405 is a single phase AC power source, the converter 410 may include four diodes of a bridge type and, when the AC power source 405 is a three-phase AC power source, the converter 410 may include six diodes of a bridge type.

Alternatively, the converter 410 may be a half bridge type converter in which two switching elements and four diodes are interconnected. When the AC power source 405 is a three-phase AC power source, the converter 410 may include six switching elements and six diodes. If the converter 410 includes switching elements, the converter 410 may perform boosting, power factor correction, and DC power conversion via switching by the switching elements.

The smoothing capacitor C implements smoothing of an input power and stores the smoothed voltage. Although FIG. 4 illustrates a single smoothing capacitor C, a plurality of smoothing capacitors may be provided to achieve stability.

Although the smoothing capacitor C is shown as being connected to an output terminal of the converter 410 in FIG. 4, the present disclosure is not limited thereto and a DC power may be directly input to the smoothing capacitor C. For example, a DC power from a solar battery may be directly input to the smoothing capacitor C or may be input to the smoothing capacitor C through DC/DC conversion. The following description will be given focusing on the illustrated parts of FIG. 4.

Both terminals of the smoothing capacitor C store the DC power and thus may be referred to as DC terminals or DC link terminals. The DC terminal voltage detector B may detect a DC terminal voltage Vdc across both terminals of the smoothing capacitor C. To this end, the DC terminal voltage detector B may include a resistor, an amplifier, etc. The detected DC terminal voltage Vdc may be a discrete pulse signal and may be input to the inverter controller 430.

The inverter 420 may include a plurality of inverter switching elements and convert the DC voltage Vdc smoothed by an on/off operation of the switching elements into three-phase AC voltages va, vb, and vc having predetermined frequencies to thereby output the same to the three-phase synchronous motor 230. The inverter 420 includes upper arm switching elements Sa, Sb, and Sc and lower arm switching elements S'a, S'b, and S'c, each pair of an upper arm switching element and a lower arm switching element being serially connected and three pairs of upper and lower arm switching elements Sa and S'a, Sb and S'b, and Sc and S'c being connected in parallel. Diodes are connected in anti-parallel to the respective switching elements Sa, S'a, Sb, S'b, Sc, and S'c.

The switching elements included in the inverter 420 are respectively turned on or off based on the inverter switching control signal Sic from the inverter controller 430. Thereby, the three-phase AC voltages having predetermined frequencies are output to the three-phase synchronous motor 230.

The inverter controller 430 may control a switching operation of the inverter 420 based on a sensorless scheme. To this end, the inverter controller 430 may receive the output current io detected by the output current detector E.

To control the switching operation of the inverter 420, the inverter controller 430 outputs the inverter switching control signal Sic to the inverter 420. The inverter switching control signal Sic is a PWM based switching control signal and is generated based on the output current value io detected by the output current detector E. A detailed description related to output of the inverter switching control signal Sic in the inverter controller 430 will be given later with reference to FIG. 5.

The output current detector E detects the output current io flowing between the inverter 420 and the three-phase motor 230. That is, the output current detector E may detect all output currents ia, ib, and ic of the respective phases of the motor 230. Alternatively, the output current detector E may detect output currents of two phases using three-phase balance.

The output current detector E may be located between the inverter 420 and the motor 230. For current detection, a CT, a shunt resistor, etc. may be used as the output current detector E.

When shunt resistors are used, three shunt resistors may be located between the inverter 420 and the synchronous motor 230 or either terminals of the three shunt resistors may be connected to the three lower arm switching elements S'a, S'b, and S'c of the inverter 420. Meanwhile, two shunt resistors may be used based on three-phase balance. Alternatively, when a single shunt resistor is used, the shunt resistor may be located between the above-described capacitor C and the inverter 420.

The detected output current io may be a discrete pulse signal and may be applied to the inverter controller 430. Thus, the inverter switching control signal Sic is generated based on the detected output current io. The following description may explain that the detected output current io is the three-phase output currents ia, ib, and ic.

The output voltage detector E is located between the inverter 420 and the motor 230 and detects an output voltage applied from the inverter 420 to the motor 230. When the inverter 420 is operated by a PWM based switching control signal, the output voltage may be a PWM based pulse voltage.

In order to detect the PWM based pulse voltage, the output voltage detector E may include a resistor electrically connected between the inverter 420 and the motor 230 and a comparator connected to one terminal of the resistor. A detailed description of the output voltage detector E will be given later with reference to FIG. 8a.

Meanwhile, the three-phase motor 230 includes a stator and a rotor. An AC power of a predetermined frequency is applied to a coil of the stator of each phase (each of phases a, b, and c), thereby rotating the rotor. The motor 230 may include, for example, a Surface Mounted Permanent Magnet Synchronous Motor (SMPMSM), an Interior Permanent Magnet Synchronous Magnet Synchronous Motor (IPMSM), or a Synchronous Reluctance Motor (SynRM). Among these motors, the SMPMSM and the IPMSM are Permanent Magnet Synchronous Motors (PMSMs) including a permanent magnet and the SynRM contains no permanent magnet.

If the converter 410 includes a switching element, the inverter controller 430 may control a switching operation of the switching element in the converter 410. To this end, the inverter controller 430 may receive the input current is detected by the input current detector A.

In order to control the switching operation of the converter 410, the inverter controller 430 may output a converter switching control signal Scc to the converter 410. The converter switching control signal Scc may be a PWM based switching control signal and may be generated based on the input current is detected by the input current detector A.

Figure 5:
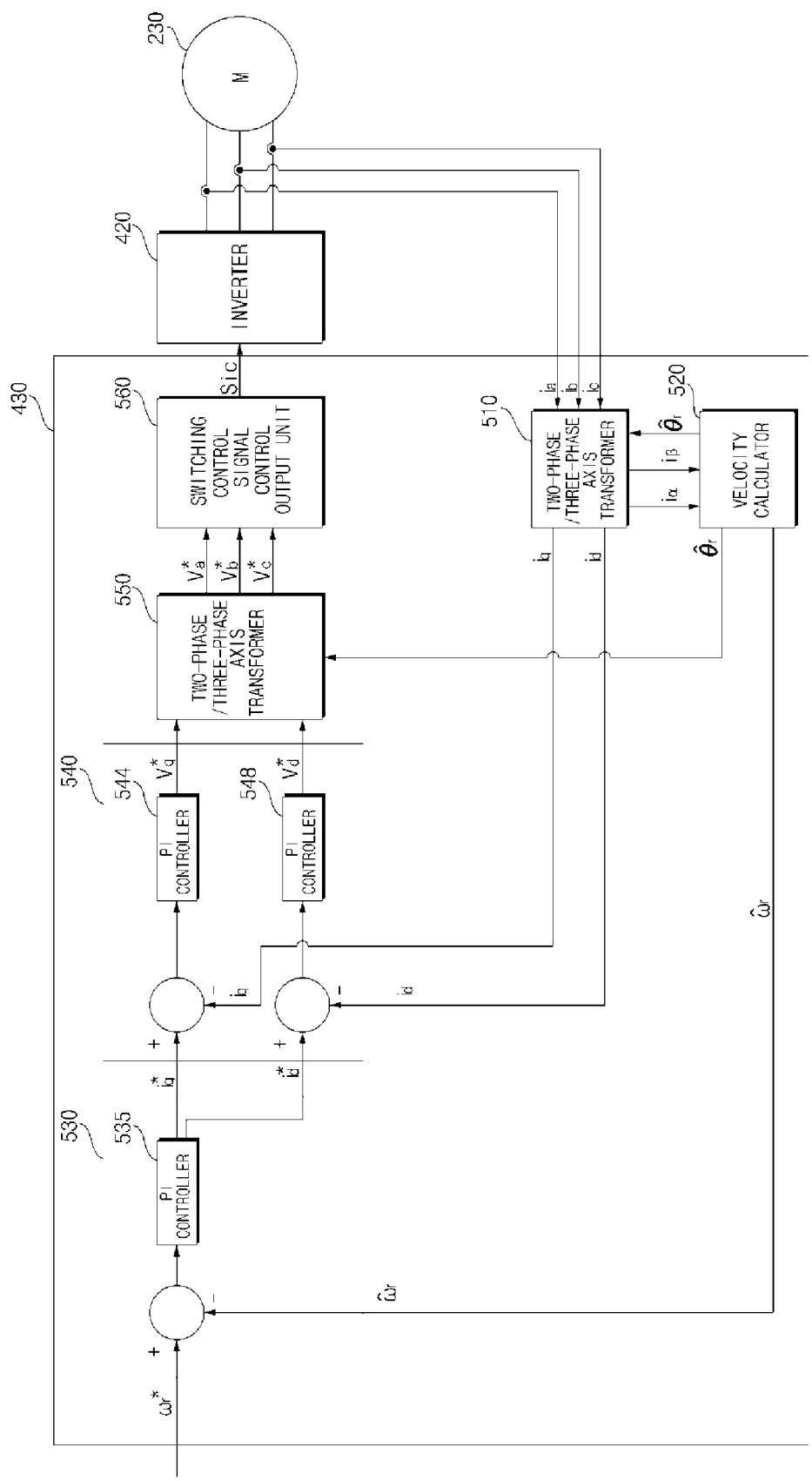
FIG. 5 is a block diagram of the internal configuration of an inverter controller shown in FIG. 4.

FIG. 5 is a block diagram of the internal configuration of the inverter controller shown in FIG. 4. Referring to FIG. 5, the inverter controller 430 may include an axis transformer 510, a velocity calculator 520, a current command generator 530, a voltage command generator 540, an axis transformer 550, and a switching control signal output unit 560.

The axis transformer 510 may receive output currents ia, ib, and is detected by the output current detector E and transform the same into two-phase currents iα and iβ of the stationary coordinate system and two-phase currents id and iq of the rotating coordinate system. The axis transformer 510 may externally output the two-phase currents iα and iβ of the stationary coordinate system, two-phase voltages vα and vβ of the stationary coordinate system, the two-phase current id and iq of the rotating coordinate system, and two-phase voltages vd and vq of the rotating coordinate system.

The velocity calculator 520 may receive the two-phase currents iα and iβ of the stationary coordinate system and the two-phase voltages vα and vβ of the stationary coordinate system, which have been axis-transformed by the axis transformer 510, and calculate a rotor location θ and velocity w of the motor 230.

The current command generator 530 generates a current command value i*q based on calculated velocity $\hat{\omega}_r$ and a velocity command value ω*r. For example, the current command generator 530 may generate the current command value i*q through Proportional Integral (PI) control of a PI controller 535 based on a difference between the calculated velocity $\hat{\omega}_r$ and the velocity command value ω*r. Although FIG. 5 illustrates the q-axis current command value i*q as a current command value, the current command generator 530 may further generate a d-axis current command value i*d. The d-axis current command value i*d may be set to 0. The current command generator 530 may further include a limiter (not shown) that limits the level of the current command value i*q so as not to exceed an allowable range.

Next, the voltage command generator 540 may generate d-axis and q-axis voltage command values v*d and v*q based on the d-axis and q-axis currents id and iq, which have been axis-transformed into two-phase currents of the rotating coordinate system by the axis transformer 510 and on the current command values i*d and i*q generated by the current command generator 530. For example, the voltage command generator 540 may generate the q-axis voltage command value v*q through PI control of a PI controller 544 based on a difference between the q-axis current iq and the q-axis current command value i*q. In addition, the voltage command generator 540 may generate the d-axis voltage command value v*d through PI control of a PI controller 548 based on a difference between the d-axis current id and the d-axis current command value i*d. The d-axis voltage command value v*d may be set to 0 to correspond to the d-axis current command value i*d that is set to 0.

The voltage command generator 540 may further include a limiter (not shown) that limits the levels of the d-axis and q-axis voltage command values v*d and v*q so as not to exceed an allowable range. The generated d-axis and q-axis voltage command values v*d and v*q may be input to the axis transformer 550.

The axis transformer 550 receives the location $\hat{\theta}_r$ calculated by the velocity calculator 520 and the d-axis and q-axis voltage command values v*d and v*q to implement axis transformation of the same. First, the axis transformer 550 implements transformation of a two-phase rotating coordinate system into a two-phase stationary coordinate system. In this case, the location $\hat{\theta}_r$ calculated by the velocity calculator 520 may be used. The axis transformer 550 performs transformation of the two-phase stationary coordinate system into a three-phase stationary coordinate system. Through this transformation, the axis transformer 550 outputs three-phase output voltage command values v*a, v*b, and v*c.

The switching control signal output unit 560 generates an inverter switching control signal Sic according to a PWM scheme based on the three-phase output voltage command values v*a, v*b, and v*c. The output inverter switching control signal Sic may be converted into a gate drive signal by a gate driver (not shown) and may then be input to gates of respective switching elements included in the inverter 420. Thereby, the respective switching elements Sa, S'a, Sb, S'b, Sc, and S'c of the inverter 420 may perform a switching operation.

Figure 6:
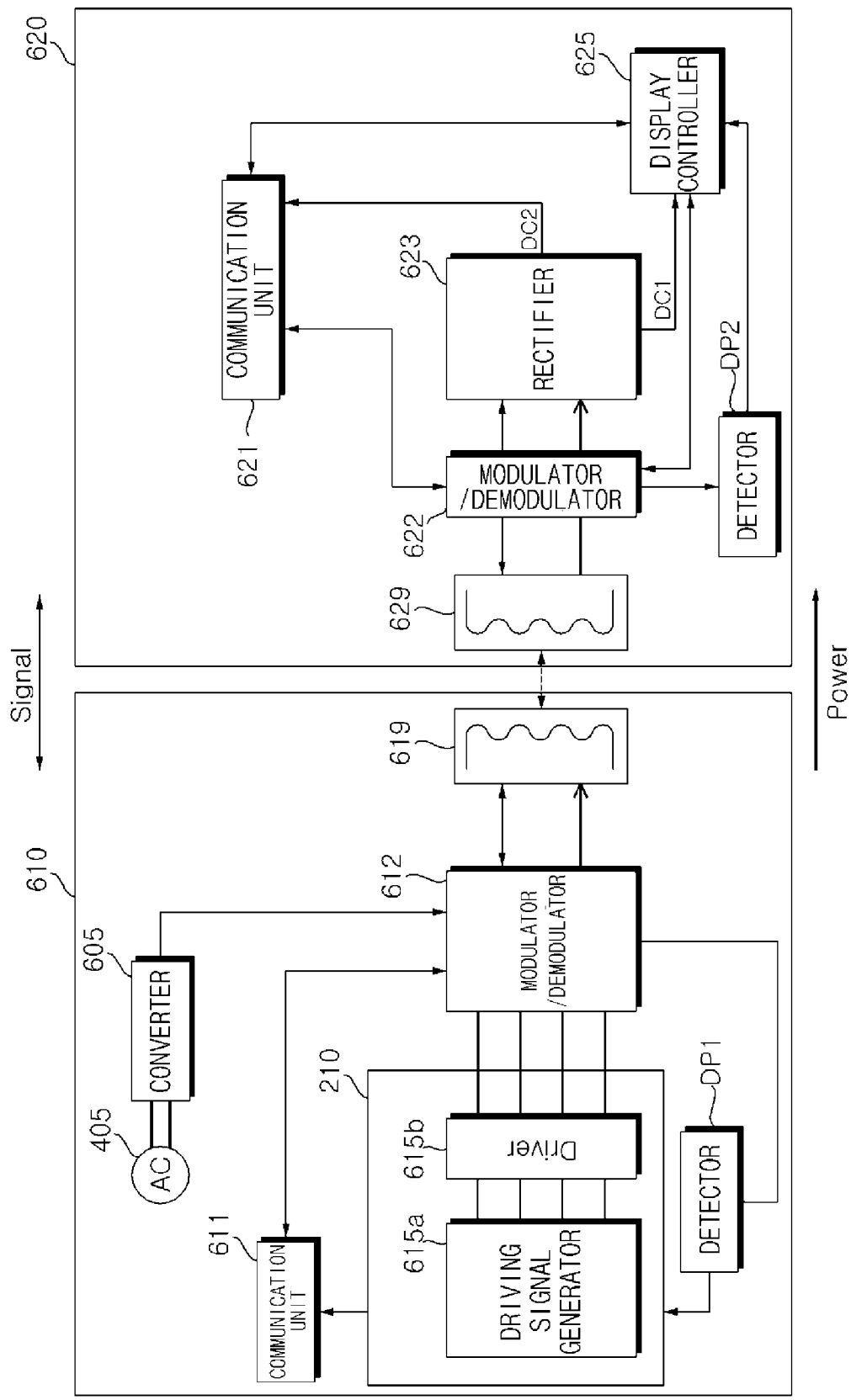
FIG. 6 is a block diagram of the internal configuration of a first circuit unit and a second circuit unit of a home appliance according to an embodiment of the present disclosure.
Figure 7:
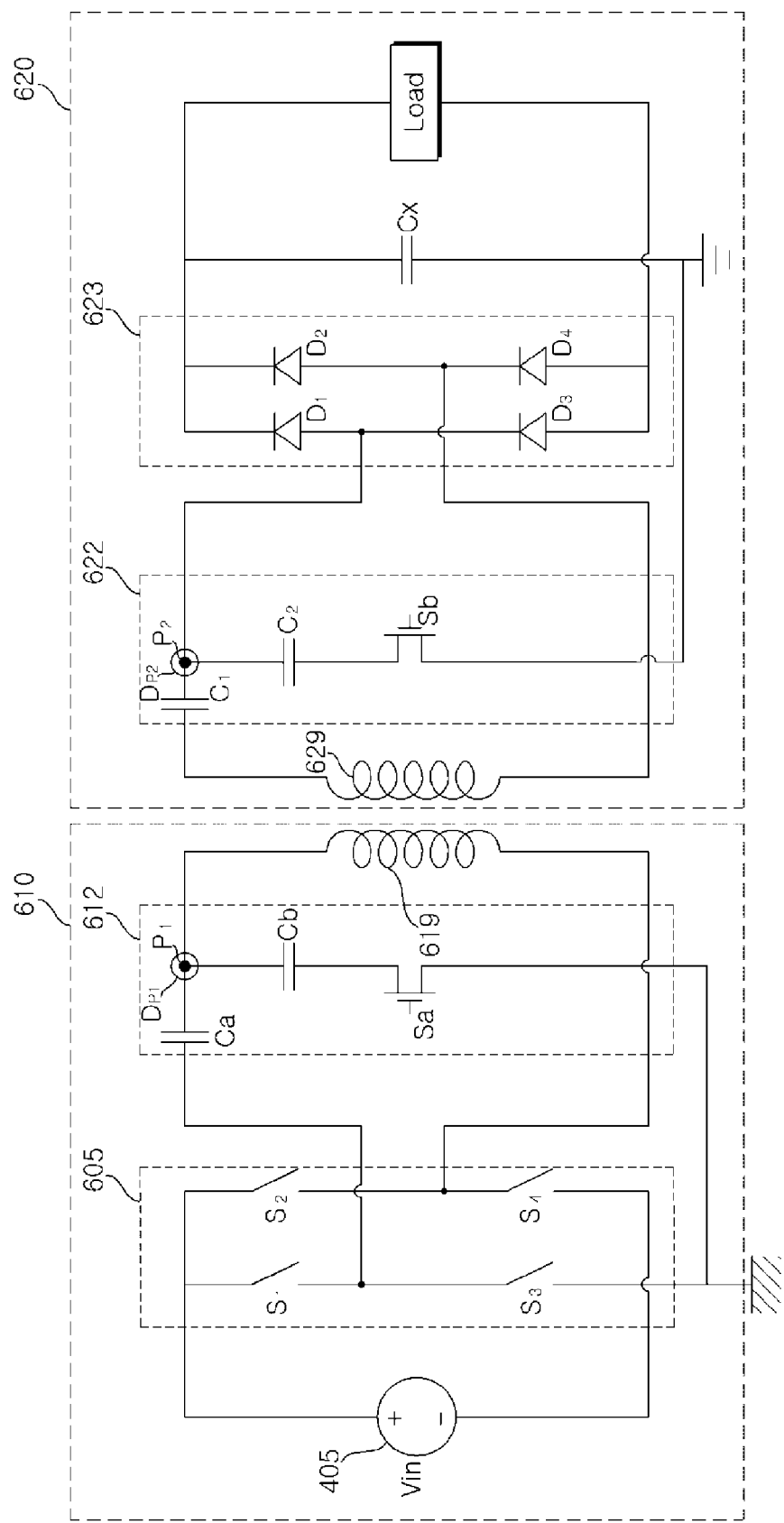
FIG. 7 is a circuit diagram of the first circuit unit and the second circuit unit of FIG. 6.

FIG. 6 is a block diagram of the internal configuration of a first circuit unit and a second circuit unit of a home appliance according to an embodiment of the present disclosure. FIG. 7 is a circuit diagram of the first circuit unit and the second circuit unit of FIG. 6. Referring to FIG. 6, the home appliance may include a first circuit unit 610 and a second circuit unit 620.

The first circuit unit 610 may include a converter 605 for converting an AC power into a DC power, a first coil 619, a first modulator/demodulator for wirelessly transmitting the DC power generated by the converter 605 using the first coil 619, and a first controller 210 for controlling the first modulator/demodulator 612. The first modulator/demodulator 612 and a second modulator/demodulator 622 enable wireless power transmission and bidirectional communication between the circuit units by performing time-division directional data communication.

Meanwhile, the first modulator/demodulator 612 and the second modulator/demodulator 622 enable wireless power transmission and bidirectional communication by varying impedance according to a load modulation scheme. The first circuit unit 610 may further include a first communication unit 611 for transmitting a data signal to the first modulator/demodulator 612 or converting a signal received from the first modulator/demodulator 612 into the data signal, for data communication.

The second circuit unit 620 may further include a second communication unit 621 for transmitting a data signal to the second modulator/demodulator 622 or converting a signal received from the second modulator/demodulator 622 into a data signal, for data communication. The power rectified by the rectifier 623 may be supplied for operation of a second controller 625 in the second circuit unit 620.

In the first circuit unit 610 and the second circuit unit 620, wireless power transmission, bidirectional communication, and other control operations may be performed by the respective controllers 210 and 625, thereby reducing manufacturing costs. The first circuit unit 610 and the second circuit unit 620 may perform wireless power transmission/reception and data transmission/reception using respective coils 619 and 629, thereby increasing operation efficiency. Further, manufacturing costs are reduced and, particularly, wireless communication can be performed without an additional antenna.

If the second circuit unit 620 is attached to a door that can be opened and closed, since no wires are needed by performing wireless power transmission to the second circuit unit 620, abrasion of the wires and deterioration of aesthetics are prevented. For example, the first controller 210 of the first circuit unit 610 may receive velocity command information for driving the motor from the second circuit unit 620, particularly, from the second controller 625. The velocity command information may be set according to operation set through the input unit 117 in the second circuit unit 620. Then, the first controller 210 of the first circuit unit 610 may control the motor to be driven according to the velocity command information through the driving unit 220.

Meanwhile, the second controller 625 of the second circuit unit 620 may receive at least one of operation state information of the home appliance, that is, current operation state, information about current flowing into the motor, voltage information, and information about power consumed in the motor, from the first controller 210 of the first circuit unit 610. Then, the second controller 625 may control the display 118 to display at least one of the current operation information, the information about current flowing into the motor, the voltage information, and the information about power consumed in the motor.

Hereinafter, a description will be given of the case in which the first controller 210 in the first circuit unit 610 is the above-described main controller and the second controller 625 in the second unit 620 is the above-described display controller. As described above, the main controller 210 may control the driving unit 220 and control the first modulator/demodulator 612 and the first communication unit 611.

The display controller 625 may control the display 118 and control the second modulator/demodulator 622 and the second communication unit 621. The first circuit unit 610 is operated by a DC power and the DC power may be supplied by the converter 605 which converts an AC power supplied by the AC power source 405 into the DC power.

The first circuit unit 610 may wirelessly transmit the DC power generated by the converter 605 to the second circuit unit 620 using the first coil 619. The first circuit unit 610 may wirelessly transmit data generated by the main controller 210, for example, information about a washing time and information about a washing course, to the second circuit unit 620 using the first coil 619.

The second circuit unit 620 may wirelessly transmit data input through the input unit or the display to the first circuit unit 610 using the second coil 629. In this case, the first circuit unit 610 and the second circuit unit 620 may perform data communication using a different impedance according to a load modulation scheme. That is, the first circuit unit 610 and the second circuit unit 620 may perform data communication by a load modulation scheme, that is, an Amplitude Modulation (AM) scheme.

For example, while the first circuit unit 610 transmits data to the second circuit unit 620, the first modulator/demodulator 612 of the first circuit unit 610 and the second modulator/demodulator 622 of the second circuit unit 620 may have a first impedance and perform data communication based on the first impedance. As another example, while the second circuit unit 620 transmits data to the first circuit unit 610, the first modulator/demodulator 612 of the first circuit unit 610 and the second modulator/demodulator 622 of the second circuit unit 620 may have a second impedance different from the first impedance and perform data communication based on the second impedance.

To vary impedance of the first modulator/demodulator 612 of the first circuit unit 610 and the second modulator/demodulator 622 of the second circuit unit 620, the first modulator/demodulator 612 of the first circuit unit 610 and the second modulator/demodulator 622 of the second circuit unit 620 desirably include respective switching elements.

The first modulator/demodulator 612 may perform RC modulation or RC demodulation based on a resistor and a capacitor. The second modulator/demodulator 622 may also perform RC modulation and RC demodulation based on a resistor and a capacitor.

Referring to FIG. 7, the first modulator/demodulator 612 may include a first capacitor Ca, a second capacitor Cb connected in parallel to the first capacitor Ca, and a switching element Sa having one terminal connected to the second capacitor Cb and the other terminal connected to a ground. Impedance may vary according to a switching operation of the first switching element Sa.

The second modulator/demodulator 622 may include a third capacitor C1, a fourth capacitor connected in parallel to the third capacitor C1, and a switching element Sb having one terminal connected to the fourth capacitor C2 and the other terminal connected to ground. Impedance may vary according to a switching operation of the second switching element Sb.

For example, during a first duration, if the first switching element Sa and the second switching element Sb are turned on, the first modulator/demodulator 612 has a Ca+Cb based first impedance due to the first capacitor Ca and the second capacitor Cb which are connected in parallel to each other in the first modulator/demodulator 612 and the second modulator/demodulator 622 has a C1+C2 based first impedance due to the third capacitor C1 and the fourth capacitor C2 which are connected in parallel to each other in the second modulator/demodulator 622.

As such, during the first duration, data transmission from the first circuit unit 610 to the second circuit unit 620 may be performed. As another example, during a second duration, if the first switching element Sa and the second switching element Sb are turned off, the first modulator/demodulator 612 has a Ca based second impedance due to the first capacitor Ca in the first modulator/demodulator 612 and the second modulator/demodulator 622 has a C1 based second impedance due to the third capacitor C1 and the fourth capacitor C2 which are connected in parallel to each other in the second modulator/demodulator 622.

As such, during the second duration, data transmission from the second circuit unit 620 to the first circuit unit 610 may be performed. The first circuit unit 610 may further include a first voltage detector DP1 for detecting a voltage VP1 of a first connection point P1 between the first capacitor Ca and the second capacitor Cb.

A detected voltage DVP1 of the first connection point is transmitted to the main controller 210 and the main controller 210 may control operation during the above-described first duration or second duration based on a level of the detected voltage DVP1 of the first connection point. For example, if the level of the detected voltage DVP1 of the first connection point corresponds to the second impedance, the main controller 210 may recognize that data is received from the second circuit unit 620 and control the first switching element Sa to be turned off. Accordingly, a signal received from the first modulator/demodulator 612 may be converted into a data signal via the communication unit 611.

The second circuit unit 620 may further include a second detector DP2 for detecting a voltage VP2 of a second connection point P2 between the third capacitor C1 and the fourth capacitor C2. A detected voltage DVP2 of the second connection point is transmitted to the display controller 625 and the display controller 625 may control an operation during the above-described first duration or second duration based on a level of the detected voltage DVP2 of the second connection point.

For example, if the level of the detected voltage DVP2 of the second connection point corresponds to the first level, the display controller 625 may recognize that data is received from the first circuit unit 610 and control the second switching element Sb to be turned on. Accordingly, a signal received from the second modulator/demodulator 622 may be converted into a data signal via the second communication unit 621.

Referring to FIG. 7, the converter 605 includes four switching elements S1 to S4 in which S1 and S3, and S2 and S4 are serially connected and a pair of serially connected switching elements S1 and S3 is connected in parallel to another pair of serially connected switching elements S2 and S4. Referring to FIG. 7, the rectifier 623 includes four diodes D1 to D4 in which D1 and D3, and D2 and D4 are serially connected and a pair of serially connected diodes D1 and D3 is connected in parallel to another pair of serially connected diodes D2 and D4.

The first circuit unit 610 and the second circuit unit 620 may perform wireless power transmission/reception and data transmission/reception using respective coils 619 and 629, thereby increasing operation efficiency. Further, manufacturing costs are reduced and, particularly, wireless communication can be performed without an additional antenna. If the second circuit unit 620 is attached to a door that can be opened and closed, since no wires are needed by performing wireless power transmission to the second circuit unit 620, abrasion of the wires and deterioration of aesthetics are prevented.

The main controller 210 in the first circuit unit 610 may control the converter 605 for wireless power transmission. The main controller 210 may control the converted DC power to be wirelessly transmitted via the first modulator/demodulator 612 and the first coil 619. Upon receiving a signal from the second circuit unit 620, the main controller 210 in the first circuit unit 610 may receive a data signal converted through the first coil 619, the first modulator/demodulator 612, and first communication unit 611.

To control the first modulator/demodulator 612, the main controller 210 may include a driving signal generator 615a for generating a driving signal and a driver 615b for generating a driving signal. During data transmission, the main controller 210 controls the communication unit 611 so that a data signal from the communication unit 611 may be wirelessly transmitted to the second circuit unit 620 via the first modulator/demodulator 612 and the first coil 619.

The second circuit unit 620 may include the second coil 629 used for wireless power reception from the first circuit unit 610 and data transmission to the first circuit unit 610, the second modulator/demodulator 622 for converting wireless power received from the second coil 629, the rectifier 623 for rectifying an AC power generated by the second modulator/demodulator 622, and the display controller 625 for controlling operation of the second modulator/demodulator 622. The display controller 625 may be operated based on the power generated by the rectifier 623.

For data communication, the second circuit unit 620 may further include a second communication unit 621 for transmitting a data signal to the second modulator/demodulator 622 or converting a signal received from the second modulator/demodulator 622 into a data signal. Upon transmission of data to the first circuit unit 610, the display controller 625 may control a data signal generated by the second communication unit 621 to the second coil 629.

The wireless power transmitted to the second circuit unit 620 passes through the second coil 629, the second modulator/demodulator 622, and the rectifier 623 and a rectified power DC1 may be supplied to the display controller 625. The data transmitted to the second circuit unit 620 may be supplied to the display controller 625 via the second coil 629, the second modulator/demodulator 622, and the communication unit 621. Meanwhile, the data transmitted by the second circuit unit 620 may be transmitted to the second coil 629 via the display controller 625, the communication unit 621, and the second modulator/demodulator 622 and may be wirelessly transmitted by the second coil 629.

Figure 8:
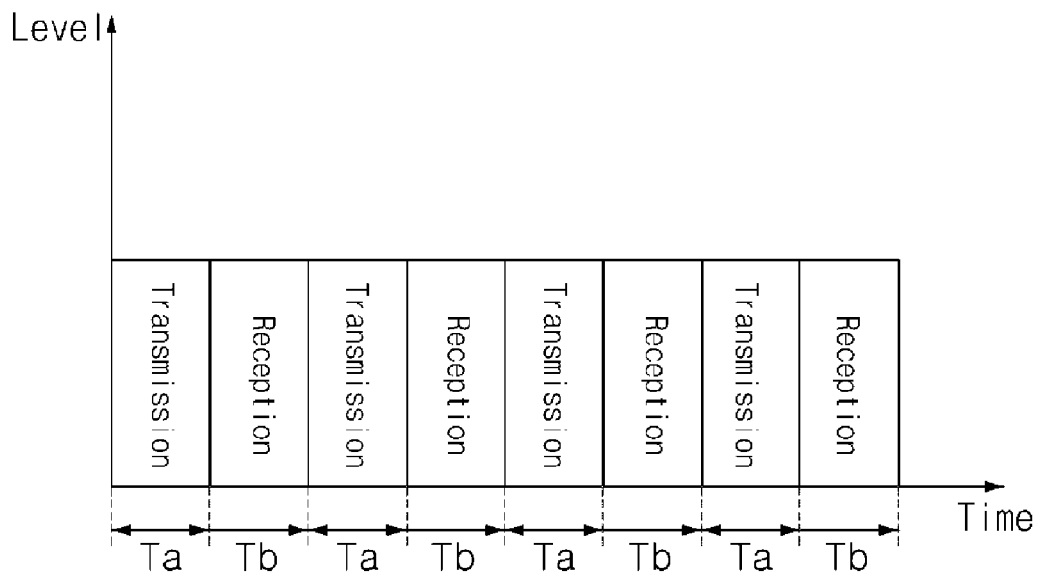
FIGS. 8 to 10b are views referred to for explaining operations of the first circuit unit and the second circuit unit of FIG. 6.

FIGS. 8 to 10b are views referred to for explaining operations of the first circuit unit and the second circuit unit of FIG. 6 FIG. 8 is a view referred to for explaining time-division data communication between the first circuit unit 610 and the second circuit unit 620.

In FIG. 8, a first duration Ta and a second duration Tb are sequentially repeated. For example, during the first duration, if the first switching element Sa and the second switching element Sb are turned on, the first modulator/demodulator 612 has a Ca+Cb based first impedance due to the first capacitor Ca and the second capacitor Cb which are connected in parallel to each other in the first modulator/demodulator 612 and the second modulator/demodulator 622 has a C1+C2 based first impedance due to the third capacitor C1 and the fourth capacitor C2 which are connected in parallel to each other in the second modulator/demodulator 622.

As such, during the first duration, data transmission from the first circuit unit 610 to the second circuit unit 620 may be performed. As another example, during the second duration, if the first switching element Sa and the second switching element Sb are turned off, the first modulator/demodulator 612 has a Ca based second impedance due to the first capacitor Ca in the first modulator/demodulator 612 and the second modulator/demodulator 622 has a C1 based second impedance due to the third capacitor C1 and the fourth capacitor C2 which are connected in parallel to each other in the second modulator/demodulator 622.

As such, during the second duration, data transmission from the second circuit unit 620 to the first circuit unit 610 may be performed. Thus, bidirectional communication can be performed.

Figure 9:
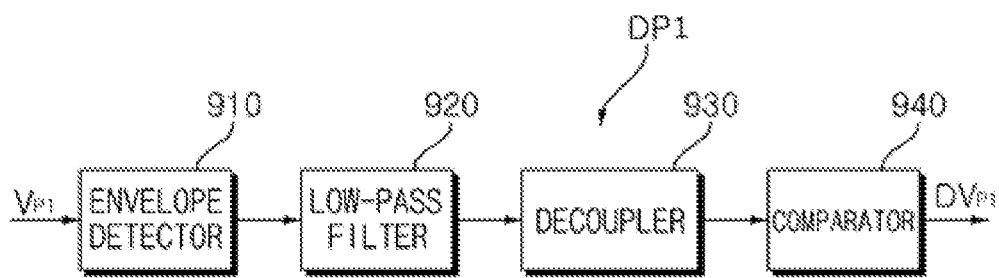

FIG. 9 is a schematic block diagram of the first voltage detector DP1 of FIG. 7. Referring to FIG. 9, the first voltage detector DP1 may include an envelope detector 910 for detecting an envelope of a first connection point voltage VP1, a low-pass filter 920 for low-pass filtering the detected envelope, a decoupler 930 for eliminating a DC component of the envelope from which a high frequency component is eliminated, and a comparator 940 for comparing the envelope from which the DC component is eliminated with a reference value.

That is, the first voltage detector DP1 may output a voltage DVP1 converted into a low level of the first connection point voltage VP1 as a detected voltage DVP1. The detected voltage DVP1 is transmitted to the main controller 210. Similarly to the first voltage detector DP1, the second voltage detector DP2 may also include internal blocks as shown in FIG. 9 and a detected voltage DVP2 may be transmitted to the display controller 625.

Figure 10A:
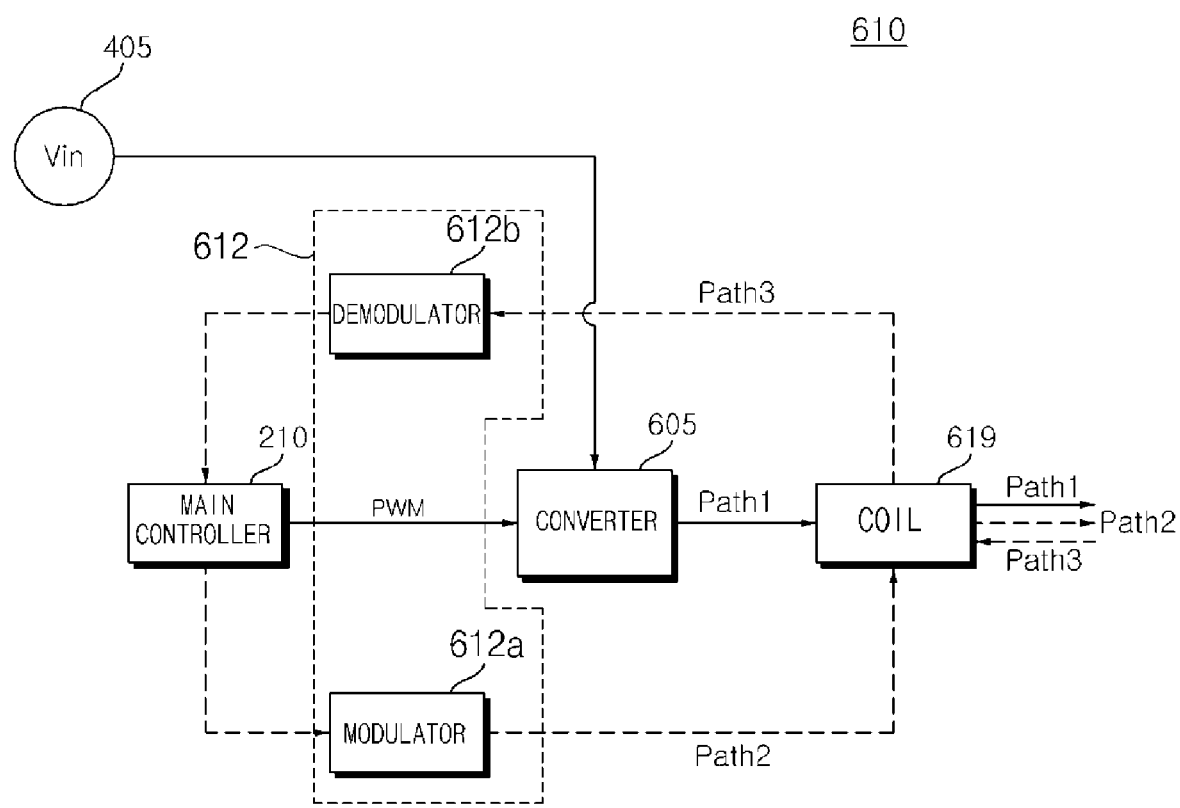

FIG. 10a is a diagram referred to for explaining operation of the first circuit unit. Referring to FIG. 10a, when the first circuit unit 610 performs wireless power transmission, the converter 605 may convert a AC power Vin from an AC power source 405 into a DC power and the DC power may be converted into the AC power using the coil 619 and the AC power may be wirelessly transmitted to the second circuit unit 620 via the coil 619. That is, a wireless power is transmitted via a path Path1. Meanwhile, as opposed to FIG. 10a, the wireless power may be transmitted via the first modulator/demodulator 612 between the converter 605 and the coil 619.

The first modulator/demodulator 612 may include a first modulator 612a and a first demodulator 612b. Next, when the first circuit unit 610 transmits data, the data may be wirelessly transmitted to the second circuit unit 620 via a path Path2 of the main controller 210, the first modulator/demodulator 612 (specifically, the first modulator 612a), and the coil 619. Meanwhile, as opposed to FIG. 10a, the data may be transmitted via the first communication unit 611 between the main controller 210 and the first modulator/demodulator 612.

When the first circuit unit 610 receives data, the data may be wirelessly received from the second circuit unit 620 via a path Path3 of the coil 619, the first modulator/demodulator 612 (specifically, the first demodulator 612b), and the main controller 210.

Figure 10B:
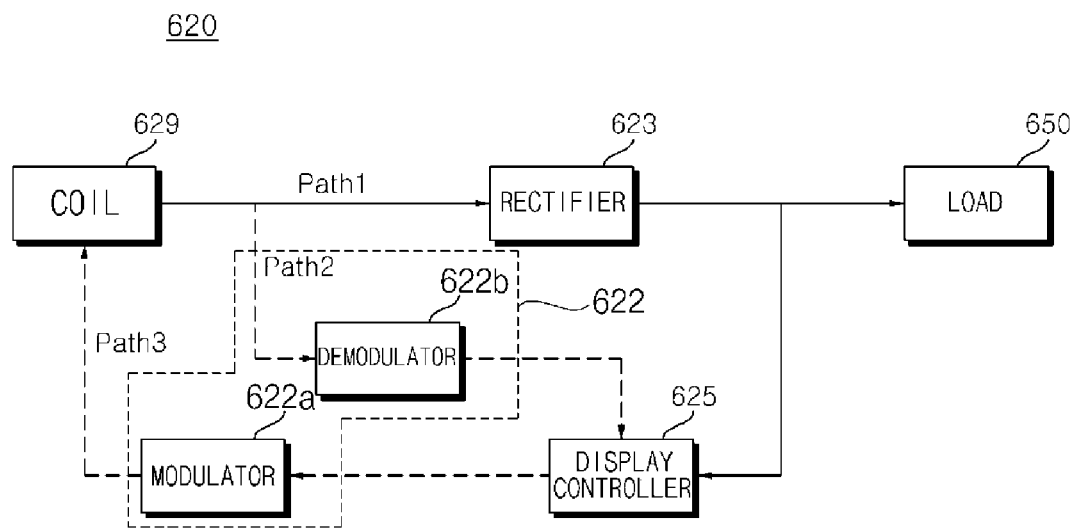

Meanwhile, as opposed to FIG. 10a, the data may be transmitted via the first communication unit 611 between the first modulator/demodulator 612 and the main controller 210. FIG. 10b is a diagram referred to for explaining operation of the second circuit.

Referring to FIG. 10b, when a wireless power is received from the first circuit unit 610, the wireless power may be received by the display controller 625 or a load 625 via a path Path1 of the coil 629, the rectifier 623, the display controller 625 or the load 650.

Meanwhile, as opposed to FIG. 10b, the wireless power may be transmitted to the display controller 625 or the load 650 via the second modulator/demodulator 622 between the coil 629 and the rectifier 623. The second modulator/demodulator 622 may include a second modulator 622a and a second demodulator 622b.

When data is received from the first circuit unit 610, the data may be received by the display controller 625 via a path Path2 of the coil 629, the second modulator/demodulator 622 (specifically, the second demodulator 622b), and the display controller 625.

Meanwhile, as opposed to FIG. 10b, the data may be transmitted via the second communication unit 621 between the second modulator/demodulator 622 (specifically, the second demodulator 622b) and the display controller 625. When data is transmitted to the first circuit unit 610, the data may be wirelessly transmitted to the first circuit unit 610 via a path Path3 of the display controller 625, the second modulator/demodulator 622 (specifically, the second modulator 622a), and the coil 629. Meanwhile, as opposed to FIG. 10b, the data may be transmitted via the second communication unit 621 between the display controller 625 and the second modulator/demodulator 622 (specifically, the second modulator 622a).

FIG. 11 is a perspective view showing an air conditioner, which is another exemplary home appliance, according to an embodiment of the present disclosure. An air conditioner 100b according to the present disclosure may include an indoor unit 31b and an outdoor unit 21b connected to the indoor unit 31b as shown in FIG. 11.

The indoor unit 31 of the air conditioner 100b may be any one of a stand type indoor unit, a wall mount type indoor unit, and a ceiling type indoor unit. In FIG. 11, the stand type indoor unit 31b is shown. Meanwhile, the air conditioner 100b may include at least one of a ventilator, an air purifier, a humidifier, and a heater, which may be operatively connected to the indoor unit 31b and the outdoor unit 21b.

The outdoor unit 21b includes a compressor (not shown) for compressing a refrigerant, an outdoor heat exchanger (not shown) for performing heat exchange between the refrigerant and outdoor air, an accumulator (not shown) for extracting a gaseous refrigerant component from the refrigerant and supplying the extracted gaseous refrigerant component to the compressor, and a four-way valve (not shown) for changing a flow channel of the refrigerant based on a heating operation. In addition, the outdoor unit 21b may further include a plurality of sensors, a valve, and an oil collector, descriptions of which will be omitted.

The outdoor unit 21a operates the compressor and the outdoor heat exchanger to compress the refrigerant or perform heat exchange with the refrigerant based on set conditions and supply the compressed refrigerant or the heat-exchanged refrigerant to the indoor unit 31b. The outdoor unit 21b may be driven according to demand of a remote controller (not shown) or the indoor unit 31b. As a cooling/heating capacity of the air conditioner 100b varies based on the indoor unit which is driven, the number of driven outdoor units and the number of driven compressors installed in outdoor units may be changed.

The outdoor unit 21b supplies the compressed refrigerant to the indoor unit 31b connected thereto. The indoor unit 31b receives the refrigerant from the outdoor unit 21b and discharges cool or hot air into a room in which the indoor unit 31b is installed. The indoor unit 31b includes an indoor heat exchanger (not shown), an indoor fan (not shown), an expansion valve (not shown) for expanding the refrigerant, and a plurality of sensors (not shown).

The outdoor unit 21b and the indoor unit 31b may be connected to each other via a communication cable to transmit and receive data to and from each other. In addition, the outdoor unit 21b and the indoor unit 31b may be connected to the remote controller (not shown) by wire or wirelessly such that the outdoor unit 21b and the indoor unit 31b can be operated under control of the remote controller (not shown).

The remote controller (not shown) may be connected to the indoor unit 31b to allow a user to input a control command for controlling the indoor unit 31b and to receive and display state information on the indoor unit 31b. Meanwhile, a display unit 118b may be located on a front panel of the indoor unit 31b. That is, the display unit 118b may be located on the front panel that can be opened and closed for filter exchange.

As described above, when the display unit 118b is located on the front panel of the indoor unit 31b, the display controller 625 for controlling the display unit 118b may be provided in the second circuit unit 620 and the main controller 210 may be provided in the first circuit unit 610 as shown in FIG. 3. In addition, wireless power transmission and data exchange may be performed between the first circuit unit 610 and the second circuit unit 620 as described previously.

FIG. 12 is a perspective view showing a refrigerator, which is still another exemplary home appliance, according to an embodiment of the present disclosure.

Referring to FIG. 12, a refrigerator 100c related to the present disclosure includes a case 110c, which has an inner space divided into a freezing compartment and a refrigerating compartment (not shown), a freezing compartment door 120c for shielding the freezing compartment, and a refrigerating compartment door 140 for shielding the refrigerating compartment, the case 110c, the freezing compartment door 120c, and the refrigerating door 140c defining an outer appearance of the refrigerator 100c.

The freezing compartment door 120c and the refrigerating compartment door 140c may be provided at front surfaces thereof with respective forwardly protruding door handles 121c to assist a user in easily pivoting the freezing compartment door 120c and the refrigerating compartment door 140c by gripping the door handles 121c.

The refrigerating compartment door 140c may further be provided at a front surface thereof with a so-called home bar 180c that allows the user to conveniently retrieve stored items, such as beverages, without opening the refrigerating compartment door 140c.

The freezing compartment door 120c may further be provided at a front surface thereof with a dispenser 160c that allows the user to easily and conveniently retrieve ice or drinking water without opening the freezing compartment door 120c. The freezing compartment door 120c may further be provided with a control panel 210c at the upper side of the dispenser 160c. The control panel 210c serves to control driving operation of the refrigerator 100c and to display a current operating state of the refrigerator 100c.

As described above, if the control panel 210c is arranged on the freezing compartment door 120c that can be opened and closed, the display controller 625 for controlling the control panel 210c may be arranged in the second circuit unit 620 and the main controller 210 may be arranged in the first circuit unit 610 as described with reference to FIG. 3. In addition, wireless power transmission and data exchange may be implemented between the first circuit unit 610 and the second circuit unit 620 as described above.

While the dispenser 160c is shown in FIG. 12 as being located at the front surface of the freezing compartment door 120c, the present disclosure is not limited thereto and the dispenser 160c may be located at the front surface of the refrigerating compartment door 140c.

Meanwhile, the freezing compartment may accommodate, in an upper region thereof, an icemaker 190c used to make ice using water supplied thereto and cold air within the freezing compartment and an ice bank 195c mounted within the freezing compartment to receive ice released from the icemaker 190c. In addition, although not shown in FIG. 12, an ice chute (not shown) may further be provided to guide the ice received in the ice bank 195c to fall into the dispenser 160c. The control panel 210c may include an input unit 220c having a plurality of buttons and a display 230c for displaying control screens, operating states, and the like.

The display 230c displays control screens, operating states, and other information, such as an internal temperature of the refrigerator. For example, the display 230c may display a service type of the dispenser 160c (ice cubes, water, crushed ice), a setting temperature of the freezing compartment, and a setting temperature of the refrigerating compartment. The display 230c may be any one of a Liquid Crystal Display (LCD), a Light Emitting Diode (LED), and an Organic Light Emitting Diode (OLED). In addition, the display 230c may be a touchscreen that may additionally perform a function of the input unit 220c.

The input unit 220c may include a plurality of manipulation buttons. For example, the input unit 220c may include a dispenser setting button (not shown) for setting a service type of the dispenser (ice cubes, water, crushed ice), a freezing compartment temperature setting button for setting a temperature of the freezing compartment, and a refrigerating compartment temperature setting button for setting a temperature of the refrigerating compartment. The input unit 220c may be a touchscreen that may additionally perform a function of the display 230c.

The refrigerator according to embodiments of the present disclosure is not limited to a double door type shown in FIG. 12 and may be any one of a one door type refrigerator, a sliding door type refrigerator, a curtain door type refrigerator, and others.

According to an embodiment of the present disclosure, a home appliance includes a first circuit unit including a converter configured to convert an Alternating Current (AC) power into a Direct Current (DC) power, a first coil, a first modulator/demodulator configured to wirelessly transmit the DC power generated by the converter using the first coil, and a first controller configured to control the first modulator/demodulator, and a second circuit including a second coil configured to receive a wireless power transmitted by the first circuit unit, a second modulator/demodulator configured to convert the wireless power received from the second coil, a rectifier configured to rectify an AC power generated by the second modulator/demodulator, and a second controller configured to control operation of the second modulator/demodulator, wherein the first modulator/demodulator and the second modulator/demodulator perform bidirectional time-division data communication. Therefore, wireless power transmission and bidirectional communication can be performed between the circuit units.

The first circuit unit and the second circuit unit vary impedance according to a load modulation scheme, thereby performing wireless power transmission and bidirectional communication therebetween. Each of the first circuit unit and the second circuit unit can perform wireless power transmission, bidirectional communication, and other control operations using one controller, thereby reducing manufacturing costs.

Each of the first circuit unit and the second circuit unit can perform wireless power transmission/reception and data transmission/reception using one coil, thereby increasing operation efficiency. Further, manufacturing costs are reduced and, particularly, wireless communication can be performed without an additional antenna.

If the second circuit unit is attached to a door that can be opened and closed, since no wires are needed by performing wireless power transmission to the second circuit unit, abrasion of the wires and deterioration of aesthetics are prevented. The home appliance according to embodiments of the present disclosure should not be limited to configurations and methods of the above-described embodiments and all or some of the embodiments may be selectively combined with one another to achieve various alterations.

The operation method of the home appliance according to the present disclosure may be implemented as processor-readable code that can be written on a processor-readable recording medium included in the home appliance. The processor-readable recording medium may be any type of recording device in which data that can be read by a processor is stored.

An the present disclosure provides a home appliance capable of performing wireless power transmission and bidirectional communication between circuit units. One embodiment of the present disclosure, includes a first circuit unit including a converter configured to convert an Alternating Current (AC) power into a Direct Current (DC) power, a first coil, a first modulator/demodulator configured to wirelessly transmit the DC power generated by the converter using the first coil, and a first controller configured to control the first modulator/demodulator, and a second circuit including a second coil configured to receive a wireless power transmitted by the first circuit unit, a second modulator/demodulator configured to convert the wireless power received from the second coil, a rectifier configured to rectify an AC power generated by the second modulator/demodulator, and a second controller configured to control operation of the second modulator/demodulator, wherein the first modulator/demodulator and the second modulator/demodulator perform bidirectional time-division data communication.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance comprising:
a first circuit including a converter configured to convert an Alternating Current (AC) power into a Direct Current (DC) power, a first coil, a first modulator/demodulator configured to wirelessly transmit the DC power generated by the converter using the first coil, and a first controller configured to control the first modulator/demodulator; and
a second circuit including a second coil configured to receive a wireless power transmitted by the first circuit, a second modulator/demodulator configured to convert the wireless power received from the second coil, a rectifier configured to rectify an AC power generated by the second modulator/demodulator, and a second controller configured to control operation of the second modulator/demodulator,
wherein the first controller controls the first modulator/demodulator and the second controller controls the second modulator/demodulator to perform bidirectional data communication between the first circuit and the second circuit,
wherein the first modulator/demodulator and the second modulator/demodulator vary impedance according to a load modulation scheme.

2. The home appliance according to claim 1, wherein the power rectified by the rectifier is supplied for operation of the second controller in the second circuit.

3. The home appliance according to claim 1, wherein the first modulator/demodulator includes:
a first capacitor;
a second capacitor connected in parallel to the first capacitor; and
a first switching element having a first terminal connected to the second capacitor and a second terminal connected to a ground, and
wherein an impedance associated with the first coil varies according to a switching operation of the first switching element.

4. The home appliance according to claim 3, wherein the second modulator/demodulator includes:
a third capacitor;
a fourth capacitor connected in parallel to the third capacitor; and
a second switching element having a first terminal connected to the fourth capacitor and a second terminal connected to a ground, and
wherein an impedance of the second coil varies according to a switching operation of the second switching element.

5. The home appliance according to claim 3, wherein the first circuit further includes:
a first voltage detector configured to detect a voltage of a first connection point between the first capacitor and the second capacitor,
wherein the first voltage detector includes,
an detector configured to detect a signal carried in the voltage of the first connection point,
a low-pass filter configured to low-pass filter the detected signal,
a decoupler to eliminate a DC component of the filtered signal form a modified signal, and
a comparator to compare the modified signal to a reference value.

6. The home appliance according to claim 3, wherein the first circuit further includes a first voltage detector configured to detect a voltage of a first connection point between the first capacitor and the second capacitor, and wherein a voltage detected by the first voltage detector is input to the first controller, the first controller controlling the first modulator/demodulator at least partially based on the voltage detected by the first voltage detector.

7. The home appliance according to claim 1,
wherein the first circuit further includes a first communication module electrically connected to the first modulator/demodulator and to transmit a first data signal to the first modulator/demodulator or convert a signal received from the first modulator/demodulator into the first data signal, for data communication, and
wherein the second circuit further includes a second communication module electrically connected to the second modulator/demodulator and to transmit a second data signal to the second modulator/demodulator or convert a signal received from the second modulator/demodulator into the second data signal, for data communication.

8. The home appliance according to claim 1, wherein, when the first circuit transmits data to the second circuit, the first modulator/demodulator of the first circuit has a first impedance and performs data communication based on the first impedance and, when the second circuit transmits data to the first circuit, the second modulator/demodulator of the second circuit has a second impedance and performs data communication based on the second impedance.

9. The home appliance according to claim 8, wherein the first modulator/demodulator has the first impedance during a first time period and the second modulator/demodulator has the second impedance during a second time period.

10. The home appliance according to claim 1, wherein the first controller controls a driving circuit that provides power to a motor associated with the home appliance and the second controller controls a display associated with the home appliance.

11. The home appliance according to claim 10, wherein the driving circuit includes:
- an inverter configured to drive the motor using the DC power converted by the converter;
- an output current detector configured to detect an output current flowing to the motor; and
- an inverter controller configured to control the inverter based on the output current flowing to the motor.

12. The home appliance according to claim 10, wherein the first controller receives velocity command information for driving the motor from the second circuit and controls the drive circuit at least partially based on the received velocity command information.

13. The home appliance according to claim 1, further comprising a display, wherein the second controller receives at least one of information identifying a current operation state of the home appliance, information about the current flowing into the motor, voltage information, or information about power consumed in the motor from the first circuit and controls the display to present the at least one of the information identifying the current operation state, the information about the current flowing into the motor, the voltage information, or the information about power consumed in the motor.

14. The home appliance according to claim 1, wherein the first modulator/demodulator and the second modulator/demodulator perform bidirectional time-division data communication.

15. The home appliance according to claim 14, wherein the first controller controls the first modulator/demodulator to cause the first coil to transmit DC power carrying a first data signal during a first time period, and wherein the second controller controls the second modulator/demodulator to cause the second coil to transmit DC power carrying a second data signal during a second time period that differs from the first time period.

16. A home appliance comprising:
- a first circuit including a converter configured to convert an Alternating Current (AC) power into a Direct Current (DC) power, a first coil, a first modulator/demodulator configured to wirelessly transmit the DC power generated by the converter using the first coil, and a first controller configured to control the first modulator/demodulator; and
- a second circuit including a second coil configured to receive a wireless power transmitted by the first circuit, a second modulator/demodulator configured to convert the wireless power received from the second coil, a rectifier configured to rectify an AC power generated by the second modulator/demodulator, and a second controller configured to control operation of the second modulator/demodulator,
- wherein the first controller controls the first modulator/demodulator and the second controller controls the second modulator/demodulator to perform bidirectional data communication between the first circuit and the second circuit, and
- wherein the home appliance further comprises a door configured to be opened and closed, wherein the second circuit is attached to the door and the first circuit is positioned away from the door.

17. The home appliance according to claim 16, further comprising an input module and a display, wherein at least one of the input module or the display is further attached to the door.

18. The home appliance according to claim 16, wherein the home appliance is any one of a laundry treatment machine, a refrigerator, an air conditioner, or a cooking machine.

19. A home appliance comprising:
- a cabinet;
- a first circuit provided at a first location of the cabinet; and
- a second circuit provided at a second location of the cabinet that differs from the first location,
- wherein the first circuit and the second circuit wirelessly exchange power, the first circuit and the second circuit have bidirectional wireless communications based on wirelessly exchanged power, and the second circuit displays information received from the first circuit via the wireless communications.

* * * * *